(12) United States Patent
Duan et al.

(10) Patent No.: US 10,492,127 B2
(45) Date of Patent: Nov. 26, 2019

(54) WIRELESS COMMUNICATIONS ACCESS METHOD, APPARATUS, PROCESSOR, AND WIRELESS TERMINAL

(71) Applicant: HUAWEI TECHNOLOGIES CO., LTD., Shenzhen, Guangdong (CN)

(72) Inventors: Xiaoyan Duan, Beijing (CN); Hui Jin, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 15/768,236

(22) PCT Filed: Sep. 21, 2016

(86) PCT No.: PCT/CN2016/099571
§ 371 (c)(1),
(2) Date: Apr. 13, 2018

(87) PCT Pub. No.: WO2017/063485
PCT Pub. Date: Apr. 20, 2017

(65) Prior Publication Data
US 2018/0343608 A1    Nov. 29, 2018

(30) Foreign Application Priority Data
Oct. 15, 2015 (CN) .......................... 2015 1 0672829

(51) Int. Cl.
*H04W 48/10* (2009.01)
*H04W 48/16* (2009.01)
(Continued)

(52) U.S. Cl.
CPC .......... *H04W 48/16* (2013.01); *H04W 48/10* (2013.01); *H04W 48/20* (2013.01); *H04W 88/06* (2013.01)

(58) Field of Classification Search
CPC .................................................... H04W 48/18
See application file for complete search history.

(56) References Cited

U.S. PATENT DOCUMENTS 8,149,788 B1    4/2012  Vargantwar
8,588,194 B2   11/2013  Chen
(Continued)

FOREIGN PATENT DOCUMENTS

CN    101087301 A    12/2007
CN    101175304 A     5/2008
(Continued)

OTHER PUBLICATIONS

Extended European Search Report issued in European Application No. 15901492.7 dated Jun. 11, 2018, 10 pages.
(Continued)

*Primary Examiner* — Michael T Vu
(74) *Attorney, Agent, or Firm* — Fish & Richardson P.C.

(57) ABSTRACT

The present disclosure provides a wireless communications access methods, apparatuses, processors, and wireless terminals. The example method includes obtaining a service capability of an access node accessible by the wireless terminal, where the service capability is used to indicate communication quality of service supported by the access node. An access node having the service capability that supports the device type and/or the service type of the wireless terminal is determined as a target access node according to the service capability of the access node and a device type and/or a service type of the wireless terminal. A wireless communications network is then accessed by using the target access node. Therefore, the wireless terminal autonomously selects an access node having a service capa-
(Continued)

bility that can meet a communication requirement of the wireless terminal to access the wireless communications network.

15 Claims, 6 Drawing Sheets

(51) Int. Cl.
*H04W 48/20* (2009.01)
*H04W 88/06* (2009.01)

(56) References Cited

U.S. PATENT DOCUMENTS

| | | | |
|---|---|---|---|
| 9,225,706 | B2 | 12/2015 | Hoggan |
| 9,801,102 | B2 | 10/2017 | Xu et al. |
| 9,807,662 | B2 | 10/2017 | Wang et al. |
| 9,867,030 | B2 | 1/2018 | Aramoto et al. |
| 9,893,899 | B2 | 2/2018 | Yin et al. |
| 10,045,283 | B2 | 8/2018 | Jamadagni et al. |
| 2004/0081159 | A1 | 4/2004 | Pan et al. |
| 2005/0176429 | A1* | 8/2005 | Lee .......... H04L 45/02 455/436 |
| 2009/0116467 | A1 | 5/2009 | Shi et al. |
| 2009/0187919 | A1 | 7/2009 | Maes et al. |
| 2010/0077088 | A1 | 3/2010 | Hyun et al. |
| 2010/0190502 | A1 | 7/2010 | Qing et al. |
| 2011/0106928 | A1 | 5/2011 | Gokurakuji et al. |
| 2012/0108197 | A1 | 5/2012 | Uchiyama |
| 2012/0134269 | A1 | 5/2012 | Li et al. |
| 2012/0149381 | A1* | 6/2012 | Vargantwar ....... H04W 36/0083 455/444 |
| 2012/0236827 | A1 | 9/2012 | Izawa et al. |
| 2012/0311661 | A1 | 12/2012 | Forssell |
| 2013/0029668 | A1 | 1/2013 | Uchiyama et al. |
| 2013/0128865 | A1 | 5/2013 | Wu et al. |
| 2013/0171993 | A1 | 7/2013 | Yabuki et al. |
| 2013/0250759 | A1 | 9/2013 | Xu et al. |
| 2013/0260774 | A1 | 10/2013 | Madaiah et al. |
| 2014/0003254 | A1 | 1/2014 | Andreoli-Fang et al. |
| 2014/0029536 | A1 | 1/2014 | Tian et al. |
| 2014/0056135 | A1 | 2/2014 | Hapsari et al. |
| 2014/0086177 | A1 | 3/2014 | Adjakple et al. |
| 2014/0105010 | A1 | 4/2014 | Fang |
| 2014/0112251 | A1 | 4/2014 | Kim et al. |
| 2014/0113612 | A1 | 4/2014 | Shu |
| 2014/0140207 | A1 | 5/2014 | Chen et al. |
| 2014/0140282 | A1 | 5/2014 | Zhou et al. |
| 2014/0323129 | A1 | 10/2014 | Chen |
| 2015/0043563 | A1 | 2/2015 | Guan et al. |
| 2015/0055510 | A1 | 2/2015 | Gao et al. |
| 2015/0146688 | A1 | 5/2015 | Yasuda et al. |
| 2015/0223129 | A1 | 8/2015 | Liang et al. |
| 2015/0282026 | A1 | 10/2015 | Gupta |
| 2015/0319653 | A1 | 11/2015 | Wang et al. |
| 2015/0351139 | A1 | 12/2015 | Zhang et al. |
| 2016/0095034 | A1 | 3/2016 | Hampel et al. |
| 2016/0135236 | A1 | 5/2016 | Zhu et al. |
| 2016/0182297 | A1* | 6/2016 | Dauneria ............ H04W 4/70 709/224 |
| 2016/0205495 | A1 | 7/2016 | Hu et al. |
| 2016/0255532 | A1 | 9/2016 | Huang et al. |
| 2016/0286444 | A1 | 9/2016 | Wang |
| 2016/0309379 | A1 | 10/2016 | Pelletier et al. |
| 2017/0257726 | A1 | 9/2017 | Jeong et al. |
| 2018/0035327 | A1 | 2/2018 | Huang et al. |
| 2018/0035339 | A1 | 2/2018 | Mitsui et al. |
| 2018/0098246 | A1 | 4/2018 | Hoffmann |
| 2018/0115921 | A1 | 4/2018 | Chen et al. |
| 2018/0167854 | A1 | 6/2018 | Enomoto et al. |
| 2018/0191786 | A1 | 7/2018 | Kunz et al. |
| 2018/0213450 | A1 | 7/2018 | Futaki et al. |
| 2018/0227964 | A1 | 8/2018 | Wang et al. |
| 2018/0302835 | A1 | 10/2018 | Yamasaki et al. |
| 2018/0368028 | A1 | 12/2018 | Mufti |

FOREIGN PATENT DOCUMENTS

| | | |
|---|---|---|
| CN | 101938797 A | 1/2011 |
| CN | 102111882 A | 6/2011 |
| CN | 102340844 A | 2/2012 |
| CN | 102625377 A | 8/2012 |
| CN | 103379586 A | 10/2013 |
| CN | 103686932 A | 3/2014 |
| CN | 103843402 A | 6/2014 |
| CN | 104703220 A | 6/2015 |
| EP | 3051878 A1 | 8/2016 |
| EP | 3068168 A1 | 9/2016 |
| WO | 2014046431 A2 | 3/2014 |
| WO | 2014190467 A1 | 12/2014 |
| WO | 2015042831 A1 | 4/2015 |
| WO | 2015081540 A1 | 6/2015 |
| WO | 2017030399 A1 | 2/2017 |

OTHER PUBLICATIONS

NGMN,"5G White Paper—Executive Version by NGMN Alliance",NGMN, Alliance,dated Dec. 22, 2014,total 20 pages.
Draft 3GPP TR 22.891 V0.2.0 (Aug. 2015),3rd Generation Partnership Project;Technical Specification Group Services and System Aspects;Feasibility Study on New Services and Markets Technology Enablers;Stage 1(Release 14),dated Aug. 2015,total 73 pages.
International Search Report issued in International Application No. PCT/CN2016/099571 dated Dec. 12, 2016, 6 pages.
International Search Report issued in International Application No. PCT/CN2015/087580 dated May 9, 2016, 6 pages.
Extended European Search Report issued in European Application No. 16854867.5 dated Jun. 19, 2018, 9 pages.
Chinese Office Action issued in Chinese Application No. 201510672829 dated Mar. 11, 2019, 21 pages.
Non-Final Office Action issued in U.S. Appl. No. 15/743,442 dated Nov. 28, 2018, 45 pages.
References Cited by Examiner (PTO-892) issued in U.S. Appl. No. 15/743,442 on May 6, 2019, 1 page.
Office Action issued in Chinese Application No. 201510672829.0 dated Aug. 14, 2019, 9 pages (with English translation).

* cited by examiner

WIRELESS COMMUNICATIONS ACCESS METHOD, APPARATUS, PROCESSOR, AND WIRELESS TERMINAL

CROSS-REFERENCE TO RELATED APPLICATIONS

This application is a national stage of International Application No. PCT/CN2016/099571, filed on Sep. 21, 2016, which claims priority to Chinese Patent Application No. 201510672829.0, filed on Oct. 15, 2015. Both of the aforementioned applications are hereby incorporated by reference in their entireties.

This application claims priority to Chinese Patent Application No. 201510672829.0, filed with the Chinese Patent Office on Oct. 15, 2015, which is incorporated herein by reference in its entirety.

TECHNICAL FIELD

Embodiments of the present invention relate to communications technologies, and in particular, to a wireless communications access method, an apparatus, a processor, and a wireless terminal.

BACKGROUND

With continuous development of mobile communications technologies, the 5th generation of wireless communications system (5G, the 5th Generation of wireless communication system) supports access of multiple types of terminal devices, including a person-to-person communications device (for example, a smartphone), a machine type device, a vehicle, a drone, a robot, and the like. Different terminals have different service type requirements, and a same terminal also has different service type requirements in different scenarios. For example, a smartphone initiates voice/video call and data services in an entertainment environment, and initiates navigation and self-driving control services in an in-vehicle environment. Different device types or service types have different communication service quality of service (QoS, Quality of Service) requirements for a mobile communications network. For example, the voice/video call and data services require QoS with a high rate and a relatively low delay, and the navigation and self-driving control services require QoS with a relatively high rate and an ultra-low delay.

In addition, the 5G system further supports multiple types of access networks, such as a 3rd Generation Partnership Project (3GPP, 3rd Generation Partnership Project) network and a non-3rd Generation Partnership Project network (such as Bluetooth and a wireless local area network). There are multiple types of access nodes in an access network, such as a base station, a terminal that supports device-to-device (D2D, Device to Device) communication, and a wireless access point (AP, Wireless Access Point). Access nodes in different access networks support different communication types, such as ultra broadband wireless communication (Ultra Broadband Wireless Communication, or referred to as enhanced mobile broadband enhanced Mobile Broadband communication) and machine type communication (MTC, Machine Type Communications). Therefore, QoS (Quality of Service, quality of service) provided by access networks of different types may be different, and QoS provided by different access nodes in a same access network may also be different.

In an existing wireless communications system, when accessing a wireless communications network, a terminal selects, according to a signal status such as signal power or signal quality of the network, a serving cell for accessing the network. However, because of diversified terminal devices and services, the serving cell selected by the terminal according to the signal status may not support a service requirement of the terminal because the serving cell does not support a specific communication type.

SUMMARY

Embodiments of the present invention provide a wireless communications access method, an apparatus, a processor, and a wireless terminal, so that the wireless terminal autonomously selects an access node according to a communication service requirement of the wireless terminal to access a wireless communications network, thereby improving communication quality of service of the terminal.

According to a first aspect, an embodiment of the present invention provides a wireless communications access method, where the method is applied to a wireless terminal, and includes:

obtaining a service capability of an access node accessible by the wireless terminal, where the service capability is used to indicate communication quality of service supported by the access node;

determining, as a target access node according to the service capability of the access node and a device type and/or a service type of the wireless terminal, an access node having the service capability that supports the device type and/or the service type of the wireless terminal; and accessing a wireless communications network by using the target access node.

In a first possible implementation of the first aspect, before the obtaining a service capability of an access node accessible by the wireless terminal, the method further includes:

determining the device type and/or the service type of the wireless terminal according to a communication context of the wireless terminal.

With reference to the first aspect, or the first possible implementation of the first aspect, in a second possible implementation, cell broadcast information of the wireless communications network includes the service capability of the access node, and the obtaining a service capability of an access node accessible by the wireless terminal includes:

obtaining, according to the cell broadcast information, a service capability of a 3rd Generation Partnership Project access node accessible by the wireless terminal; and/or obtaining, according to the cell broadcast information, a service capability of a non-3rd Generation Partnership Project access node accessible by the wireless terminal; and/or obtaining a service capability of a local communications access device according to the cell broadcast information.

In a third possible implementation of the first aspect, the determining, as a target access node according to the service capability of the access node and a device type and/or a service type of the wireless terminal, an access node having the service capability that supports the device type and/or the service type of the wireless terminal includes:

if the wireless terminal has accessed a current access node, determining, according to a service capability of the current access node and the device type and/or the service type of the wireless terminal, whether the service capability of the current access node supports the device type and/or the service type of the wireless terminal; and if the service capability of the current access node supports the device type and/or the service type of the wireless terminal, determining the current access node as the target access node.

In a fourth possible implementation of the first aspect, the determining, as a target access node, an access node having the service capability that supports the device type and/or the service type of the wireless terminal includes:

determining, according to the service capability of the access node and the device type and/or the service type of the wireless terminal, the access node having the service capability that supports the device type and/or the service type of the wireless terminal; and if there are multiple access nodes having the service capability that supports the device type and/or the service type of the wireless terminal, selecting, from the multiple access nodes, an access node having maximum signal power and/or optimal signal quality as the target access node; or selecting, from the multiple access nodes according to a preset priority, an access node having a highest preset priority as the target access node.

With reference to any one of the first aspect, or the first to the fourth possible implementations of the first aspect, in a fifth possible implementation, the accessing a wireless communications network by using the target access node includes:

if the wireless terminal has accessed the current access node, establishing a wireless connection to the target access node while maintaining a wireless connection between the wireless terminal and the current access node; or releasing, by the wireless terminal, a wireless connection to the current access node, and establishing a wireless connection to the target access node.

With reference to any one of the first aspect or the possible implementations of the first aspect, in another possible implementation, the service capability of the access node is pre-stored on a network side of the wireless communications network, and the obtaining a service capability of an access node accessible by the wireless terminal includes:

establishing, by the wireless terminal, a communication connection to the network side of the wireless communications network; and obtaining, by using the communication connection, the service capability of the access node stored on the network side.

With reference to any one of the first aspect or the possible implementations of the first aspect, in another possible implementation, if the wireless terminal has accessed the current access node, the obtaining a service capability of an access node accessible by the wireless terminal includes:

obtaining, when the wireless terminal initiates a service request, the service capability of the access node accessible by the wireless terminal.

With reference to any one of the first aspect or the possible implementations of the first aspect, in another possible implementation, the determining, as a target access node according to the service capability of the access node and a device type and/or a service type of the wireless terminal, an access node having the service capability that supports the device type and/or the service type of the wireless terminal includes:

if the wireless terminal has accessed the current access node, determining, according to the service capability of the current access node and the device type and/or the service type of the wireless terminal, whether the service capability of the current access node supports the device type and/or the service type of the wireless terminal;

if the service capability of the current access node does not support the device type and/or the service type of the wireless terminal, determining, according to the service capability of the neighboring cell, or the service capability of the non-3rd Generation Partnership Project access node, or the service capability of the local access device, whether there is the access node having the service capability that supports the device type and/or the service type of the wireless terminal; and if there is the access node having the service capability that supports the device type and/or the service type of the wireless terminal, determining, as the target access node, the access node having the service capability that supports the device type and/or the service type of the wireless terminal.

According to a second aspect, an embodiment of the present invention provides a processor, where the processor includes a communications interface and a controller, where the communications interface is configured to obtain a service capability of an access node accessible by the wireless terminal, where the service capability is used to indicate communication quality of service supported by the access node; and the controller is configured to determine, as a target access node according to the service capability of the access node and a device type and/or a service type of the wireless terminal, an access node having the service capability that supports the device type and/or the service type of the wireless terminal; and the controller is further configured to instruct the communications interface to send a command, where the command instructs to access a wireless communications network by using the target access node.

In a first possible implementation of the second aspect, the controller is further configured to:

determine the device type and/or the service type of the wireless terminal according to a communication context of the wireless terminal.

With reference to the second aspect, or the first possible implementation of the second aspect, in a second possible implementation, cell broadcast information of the wireless communications network includes the service capability of the access node, and the controller is further configured to:

obtain, according to the cell broadcast information, a service capability of a 3rd Generation Partnership Project access node accessible by the wireless terminal; and/or obtain, according to the cell broadcast information, a service capability of a non-3rd Generation Partnership Project access node accessible by the wireless terminal; and/or obtain a service capability of a local communications access device according to the cell broadcast information.

In a third possible implementation of the second aspect, the controller is further configured to:

if the wireless terminal has accessed a current access node, determine, according to a service capability of the current access node and the device type and/or the service type of the wireless terminal, whether the service capability of the current access node supports the device type and/or the service type of the wireless terminal; and if the service capability of the current access node supports the device type and/or the service type of the wireless terminal, determine the current access node as the target access node.

In a fourth possible implementation of the second aspect, the controller is further configured to:

determine, according to the service capability of the access node and the device type and/or the service type of the wireless terminal, the access node having the service capability that supports the device type and/or the service type of the wireless terminal; and if there are multiple access nodes having the service capability that supports the device type and/or the service type of the wireless terminal, select, from the multiple access nodes, an access node having maximum signal power and/or optimal signal quality as the target access node; or select, from the multiple access nodes according to a preset priority, an access node having a highest preset priority as the target access node.

With reference to any one of the second aspect, or the first to the fourth possible implementations of the second aspect, in a fifth possible implementation, the controller is further configured to:

if the wireless terminal has accessed the current access node, establish a wireless connection to the target access node while maintaining a wireless connection between the wireless terminal and the current access node; or release, by the wireless terminal, a wireless connection to the current access node, and establish a wireless connection to the target access node.

According to a third aspect, an embodiment of the present invention provides a wireless terminal, including:

an obtaining module, configured to obtain a service capability of an access node accessible by the wireless terminal, where the service capability is used to indicate communication quality of service supported by the access node;

a processing module, configured to determine, as a target access node according to the service capability of the access node and a device type and/or a service type of the wireless terminal, an access node having the service capability that supports the device type and/or the service type of the wireless terminal; and an access module, configured to access a wireless communications network by using the target access node.

According to a fourth aspect, an embodiment of the present invention provides a wireless terminal, including the processor according to any possible implementation of the second aspect, a transceiver, a memory, and a bus, where the processor according to any possible implementation of the second aspect, the transceiver, and the memory communicate by using the bus;

the memory is configured to store an instruction;

the transceiver is configured to: receive a service capability of an access node accessible by the wireless terminal, and send the service capability to the processor, where the service capability is used to indicate communication quality of service supported by the access node; and the transceiver is further configured to initiate a connection request to a target access node under control of the processor, so that the wireless terminal accesses a wireless communications network by using the target access node.

In the embodiments of the present invention, the wireless terminal determines, as the target access node according to the device type and/or the service type of the wireless terminal and the service capability of the access node accessible by the wireless terminal, the access node having the service capability that supports the device type and/or the service type of the wireless terminal, and accesses the wireless communications network by using the target access node. Therefore, the wireless terminal autonomously selects an access node having a service capability that can meet a communication requirement of the wireless terminal to access the wireless communications network, thereby improving communication quality of service of the wireless terminal.

DESCRIPTION OF EMBODIMENTS

Figure 1:
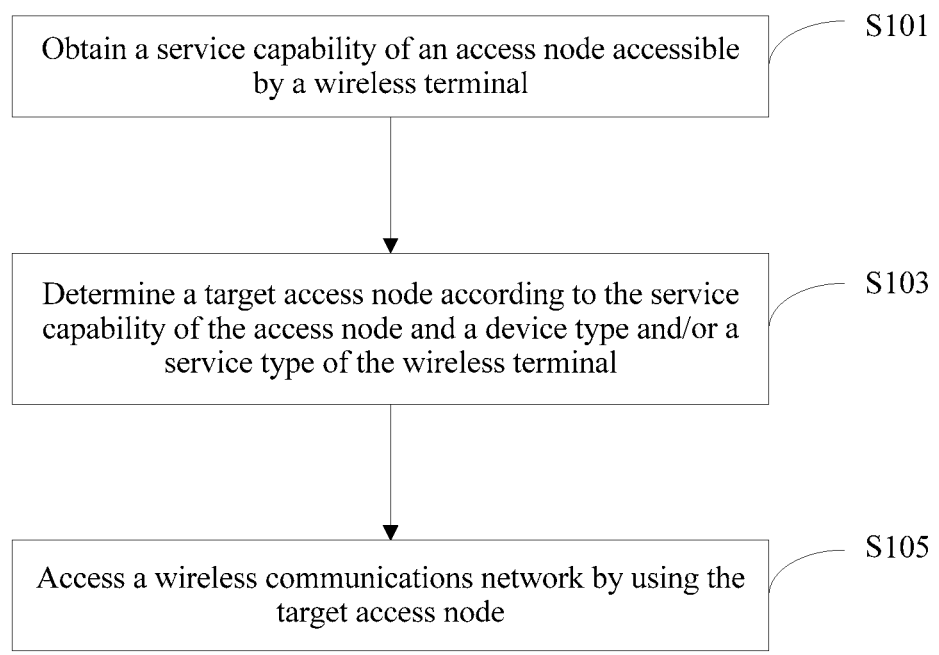
FIG. 1 is a schematic flowchart of a wireless communications access method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scone of the present invention.

First, the wording and terms used in the various embodiments are explained in the following.

It should be understood that the ordinal numbers such as "first" and "second", when mentioned in the embodiments of the present invention, are only used for distinguishing, unless the ordinal numbers definitely represent a sequence according to the context.

The technical solutions provided in the embodiments of the present invention are applied to a scenario in which a wireless terminal selects an access node according to a device type and/or a service type of the wireless terminal to access a wireless communications network. The technical solutions may be applied to a scenario in which the wireless terminal selects an access node during power-on, or may be applied to a scenario in which the wireless terminal reselects an access node after being connected to a specific access node.

In an actual application, the wireless terminal may be a device that can access the wireless communications network for communication, such as a mobile phone, a tablet computer, a smart household, a telemedicine device, a self-driving vehicle, or a local machine device.

When mentioned in the embodiments of the present invention, the "wireless communications network" refers to a wide area communications network that may be interconnected to another public network or private network to enable the wireless terminal to transmit and/or receive information. A communications body in the wireless communications network includes a wireless terminal, one or more access nodes, and a core network device that performs communication connection to the access node. For a 3G network, the core network device may be a serving GPRS support node (Serving GPRS Support Node, SGSN), or the core network device may be a mobile switching center (Mobile Switch Center, MSC); for a 4G network, the core network device may be a mobility management entity (Mobile Management Entity, MME); and for a 5G network, the core network device may be a core network control device that has a function the same as that of the MSC or the MME.

When mentioned in the embodiments of the present invention, the "access node" refers to a network access device that provides, in the wireless communications network, a wireless communication link for the wireless terminal, and specifically includes an access network device of the wireless communications network, a local communications access device, an access point of a non-3GPP access network, or the like. The access node may be a standalone physical device, or may be software installed on a specific physical device, such as a base station, a mobile phone that supports device-to-device (Device-to-Device, D2D for short) communication, or an AP (Access Point, access point, or referred to as a hotspot) of a WLAN (Wireless Local Area Network, wireless local area network) network. When mentioned in the embodiments of the present invention, an "accessible access node" refers to an access node locally accessible by the wireless terminal.

When mentioned in the embodiments of the present invention, the "device type" refers to an attribute value preset according to a main function of the wireless terminal. A communications device in a 5G system is not only limited to a wireless terminal, such as a smartphone or a tablet computer, and various communications devices that have wireless communication functions are connected to a wireless communications network in the 5G system, such as a smart household, a wearable device, a self-driving vehicle, and a telemedicine machine. Different communications devices have different device types, and the different device types have different quality of service requirements for the wireless communications network, for example, device types of machines in a factory that communicate with each other by using a base station installed inside or near the factory are a machine type device (Machine Type Device), and a device type of a self-driving vehicle is a vehicle type device (Vehicle Type Device). One wireless terminal may be corresponding to one device type, or may be simultaneously corresponding to multiple device types. For example, a mobile phone may include multiple device types, such as a communications device and a vehicle type device.

When mentioned in the embodiments of the present invention, the "service type" refers to an attribute value preset according to quality of service that is of wireless network communication and that is required by different services. For example, a self-driving service executed by a self-driving vehicle requires an ultra-low delay, and therefore a service type of the self-driving service is an ultra-low latency service (ultra-low latency service); and machines in a factory communicate with each other by using a base station inside or near the factory, and therefore service types of the machines are a local machine type communication service (Local Machine Type Communication service). One wireless terminal may be corresponding to one service type, or may be corresponding to multiple service types. For example, when a mobile phone initiates a voice communication service, a service type of the mobile phone is a voice communication service (Voice Communication service), or when a mobile phone initiates an in-vehicle navigation service, a service type of the mobile phone is an ultra reliable communication service.

When mentioned in the embodiments of the present invention, the "service capability" refers to communication quality of service supported by the access node, and may specifically include ultra reliable communication (Ultra Reliable Communication), ultra broadband communication (Ultra Broadband Communication), vehicle-to-everything communication (V2X Communication), device-to-device communication (D2D Communication), local machine type communication (Local Machine Type Communication), ultra-low latency communication (ultra-low latency communication), and the like. One access node may support one service capability, or may support multiple service capabilities.

The technical solutions of the present invention may be applied to various wireless communications systems, such as a Global System for Mobile Communications (Global System for Mobile Communications, GSM for short), a general packet radio service (General Packet Radio Service, GPRS for short) system, a Code Division Multiple Access (Code Division Multiple Access, CDMA for short) system, a CDMA2000 system, a Wideband Code Division Multiple Access (Wideband Code Division Multiple Access, WCDMA for short) system, a Long Term Evolution (Long Term Evolution, LTE for short) system, a Worldwide Interoperability for Microwave Access (World Interoperability for Microwave Access, WiMAX for short) system, or a 5G system.

The following describes technical solutions of the present invention in detail by using specific embodiments. The following specific embodiments may be mutually combined, and same or similar concepts or processes may not be repeatedly described in some embodiments.

FIG. 1 is a schematic flowchart of a wireless communications access method according to an embodiment of the present invention. As shown in FIG. 1, the wireless communications access method in this embodiment is executed by a wireless terminal, and the method includes the following steps:

S101. Obtain a service capability of an access node accessible by a wireless terminal.

S103. Determine a target access node according to the service capability of the access node and a device type and/or a service type of the wireless terminal.

A service capability of the target access node supports the device type and/or the service type of the wireless terminal.

S105. Access a wireless communications network by using the target access node.

Specifically, the device type and/or the service type of the wireless terminal may be pre-stored in the wireless terminal, or may be stored in a SIM (subscriber identity module, subscriber identity module) card of the wireless terminal. For example, the device type of the wireless terminal is preset, in a self-driving vehicle, to a vehicle type device (Vehicle Type Device), and the device type of the wireless terminal is preset, in a machine in a factory, to a machine type device (Machine Type Device). The device type and/or the service type of the wireless terminal may be further determined by the wireless terminal according to a communication context. The communication context herein refers to information such as a current communication environment or service feature detected by the terminal by using a sensor, an interface, an application program, and the like. For example, when a smartphone is inserted into a navigation interface of a vehicle, or when a smartphone enables a navigation application, it may be learned, by using a communication context of the smartphone, that the smartphone is to initiate a navigation service to determine a device type of the smartphone as a vehicle type device or determine a service type initiated by the smartphone as an ultra-low delay service.

During power-on, the wireless terminal may obtain the service capability of the access node locally accessible by the wireless terminal, and select the access node having the service capability that supports the device type and/or the service type of the wireless terminal. Alternatively, when initiating a service request, the wireless terminal may obtain the service capability of the accessible access node, and select the access node having the service capability that supports the device type and/or the service type of the wireless terminal.

A 3GPP access network is used as an example. A specific process in which the wireless terminal obtains the service capability of the access node is as follows:

Process 1:

1. After being powered on, the wireless terminal searches a frequency band supported by the wireless terminal for a cell or searches for a cell according to stored cell information.

2. For a found cell, the wireless terminal receives and reads system information that is broadcast by the cell, and the system information may include information about a 3GPP access node and information about another locally accessible access node. Specifically, the system information includes:

(1) information about a 3GPP access node, which includes information such as service capabilities/a service capability supported by a serving cell (that is, a cell that broadcasts the system information) and/or a neighboring cell, and may further include types/a type of a serving cell and/or a neighboring cell, for example, a mobile cell (Nomadic Cell, or Mobile Cell), where the mobile cell is a cell provided by a mobile device (such as an in-vehicle micro base station or an in-vehicle WLAN access point);

(2) information about a non-3GPP access node, such as information about adjacent (including overlapping coverage) APs of a WLAN network; and (3) information about a nearby local communications access device, such as D2D device information and in-vehicle communications access device information.

3. The wireless terminal determines the service capability of the accessible access node according to access node information in the system information that is broadcast by the cell.

Process 2:

1. The wireless terminal initiates a registration request by using a first access node, that is, the wireless terminal sends wireless signaling (for example, a radio resource control connection request RRC Connection Request message, RRC: Radio Resource Control) that carries the registration request. Specifically, the wireless terminal may select the first access node by using an existing network selection technology, that is, the wireless terminal does not determine whether the access node can meet a requirement of a current device type or service type of the wireless terminal.

2. After receiving the registration request, the first access node sends, to the wireless terminal, wireless signaling (for example, a radio resource control connection setup RRC Connection Setup message, RRC: Radio Resource Control, or a radio resource control connection redirection RRC Connection Redirection message) that carries access node information. The access node information herein may include the information about the 3GPP access node and the information about the another access node. Specific content of the access node information herein is similar to specific meanings of the information about the 3GPP access node and the information about the another locally accessible access node that are in the foregoing embodiment, and includes the information about the 3GPP access node and the information about the another access node.

3. The wireless terminal determines the service capability of the accessible access node according to the received access node information.

Further, if a service capability of the first access node supports the device type and/or the service type of the wireless terminal, the wireless terminal selects the first access node as the target access node, and continues to complete a registration process by using the first access node; or if a service capability of the first access node does not support the device type and/or the service type of the wireless terminal, the wireless terminal selects the another access node (a second access node) other than the first access node, and re-initiates a registration request by using the second access node to complete registration.

Process 3:

In this case, if the wireless terminal has accessed an access node, that is, a current access node, the wireless terminal may obtain the information about the 3GPP access node and the information about the another access node according to cell broadcast information of the current access node. Specific content of the access node information herein is similar to specific meanings of the information about the 3GPP access node and the information about the another access node that are in the foregoing embodiment.

Alternatively, the access node information is pre-stored on a network side of the wireless communications network. Because the wireless terminal has established a communication connection to the network side of the wireless communications network, the wireless terminal may obtain, from the network side by using the established communication connection, information about the access node accessible by the wireless terminal. Specific content of the access node information herein is similar to specific meanings of the information about the 3GPP access node and the information about the another locally accessible access node that are in the foregoing embodiment, and includes the information about the 3GPP access node and the information about the another access node.

The wireless terminal determines the service capability of the accessible access node according to the access node information.

There may be one or more access nodes accessible by the wireless terminal.

One access node may support one service capability, or may support multiple service capabilities. There are multiple specific representation forms, for example, a situation of a service capability of an access node A is shown in the following table, where bit N represents a service capability, 1 represents support (support), and 0 represents not support (not support):

| Bit 5 | Bit 4 | Bit 3 | Bit 2 | Bit 1 |
|-------|-------|-------|-------|-------|
| 0 | 0 | 1 | 1 | 0 |

Bit 5: ultra reliable communication (ultra reliable communication), 0: not support;
Bit 4: ultra broadband communication (ultra broadband communication), 0: not support;
Bit 3: V2X communication (vehicle-to-everything communication), 1: support;
Bit 2: D2D communication (device-to-device communication), 1: support; and
Bit 1: xx communication (xx communication), 0: not support.

It can be learned from the foregoing table that the service capability of the access node A includes the vehicle-to-everything communication and the device-to-device communication.

After obtaining the service capability of the access node, the wireless terminal determines, as the target access node, the access node having the service capability that supports the device type and/or the service type of the wireless terminal.

Further, there are three manners of determining the target access node, and any one of the three manners may be selected for use:

1. The wireless terminal determines, as the target access node from the access node accessible by the wireless terminal and according to the device type of the wireless terminal and the service capability of the access node accessible by the wireless terminal, the access node having the service capability that supports the device type of the wireless terminal.

For example, a device type of a wireless terminal $UE_1$ is a vehicle type device (Vehicle Type Device). There are two access nodes accessible by the $UE_1$, which are respectively a base station A and a base station B. A service capability of the base station A is ultra broadband communication (Ultra Broadband Communication), and a service capability of the base station B is vehicle-to-everything communication (V2X Communication); and the service capability of the base station B supports the device type of the $UE_1$. Therefore, a core network device determines the base station B as a target access node of the $UE_1$.

2. The wireless terminal determines, as the target access node from the access node accessible by the wireless terminal and according to the service type of the wireless terminal and the service capability of the access node accessible by the wireless terminal, the access node having the service capability that supports the service type of the wireless terminal.

For example, a wireless terminal $UE_1$ initiates a navigation service, and a service type corresponding to the navigation service is an ultra reliable communication (Ultra Reliable Communication) service. There are two access nodes accessible by the wireless terminal $UE_1$, which are respectively a base station C and a wireless terminal device $UE_2$ that supports device-to-device (Device-to-Device, D2D for short) communication. A service capability of the base station C is ultra reliable communication (Ultra Reliable Communication), and a service capability of the $UE_2$ is ultra broadband communication (Ultra Broadband Communication); and the service capability of the base station C supports a device type of the $UE_1$. Therefore, a core network device determines the base station C as a target access node of the $UE_1$.

3. The wireless terminal determines, as the target access node from the access node accessible by the wireless terminal and according to the device type and the service type of the wireless terminal and the service capability of the access node accessible by the wireless terminal, the access node having the service capability that supports the device type and the service type of the wireless terminal.

For example, a device type of a wireless terminal $UE_1$ is a machine type device (Machine Type Device), a service type of the $UE_1$ is local machine type communication (Local Machine Type Communication), and an access node accessible by the $UE_1$ is a base station D. A service capability of the base station D is local machine type communication (Local Machine Type Communication), and the service capability of the base station D supports the device type and the service type of the $UE_1$. Therefore, a core network device determines the base station D as a target access node of the $UE_1$.

There are multiple methods for determining whether the service capability of the access node supports the device type and/or the service type of the wireless terminal, for example, a relationship mapping table between the device type and/or the service type of the wireless terminal and the service capability of the access node is preset in the wireless terminal. The wireless terminal determines, according to the device type and/or the service type of the wireless terminal, the service capability of the access node, and the relationship mapping table, whether the service capability of the access node supports the device type and/or the service type of the wireless terminal; or determines, according to quality of service required by the device type and/or the service type of the wireless terminal and quality of service supported by the service capability of the access node, whether the service capability of the access node supports the device type and/or the service type of the wireless terminal. A specific determining method is not limited in this embodiment of the present invention.

Further, when there are multiple access nodes having the service capability that supports the device type and/or the service type of the wireless terminal, selection is performed from the multiple access nodes. There are multiple selection methods, including but not limited to: presetting priorities for different access nodes, and determining a target access node according to the preset priorities; presetting a preference access node in the wireless terminal, and determining a target access node according to a user-set preference access node, and the like.

After determining the target access node, the wireless terminal is connected to the target access node to access the wireless communications network. If the wireless terminal selects the access node during power-on, and uses the foregoing specific process 1 in which the wireless terminal obtains the service capability of the access node during power-on, the wireless terminal directly accesses the target access node. If the wireless terminal has established a connection to an access node, the wireless terminal may establish a connection to the target access node after being disconnected from an existing access node; or may establish a connection to the target access node while maintaining a connection to an existing access node. For example, when initiating a video service, and maintaining a connection to an original serving cell, UE establishes, with the core network device by using a target serving cell selected by the UE, a video service bearer used to support a service type of the UE, performs the video service, and performs corresponding QoS control and a corresponding charging process.

In this embodiment of the present invention, the wireless terminal determines, as the target access node according to the device type and/or the service type of the wireless terminal and the service capability of the access node accessible by the wireless terminal, the access node having the service capability that supports the device type and/or the service type of the wireless terminal, and accesses the wireless communications network by using the target access node. Therefore, the wireless terminal autonomously selects an access node having a service capability that can meet a communication requirement of the wireless terminal to access the wireless communications network, thereby improving communication quality of service of the wireless terminal.

Figure 2:
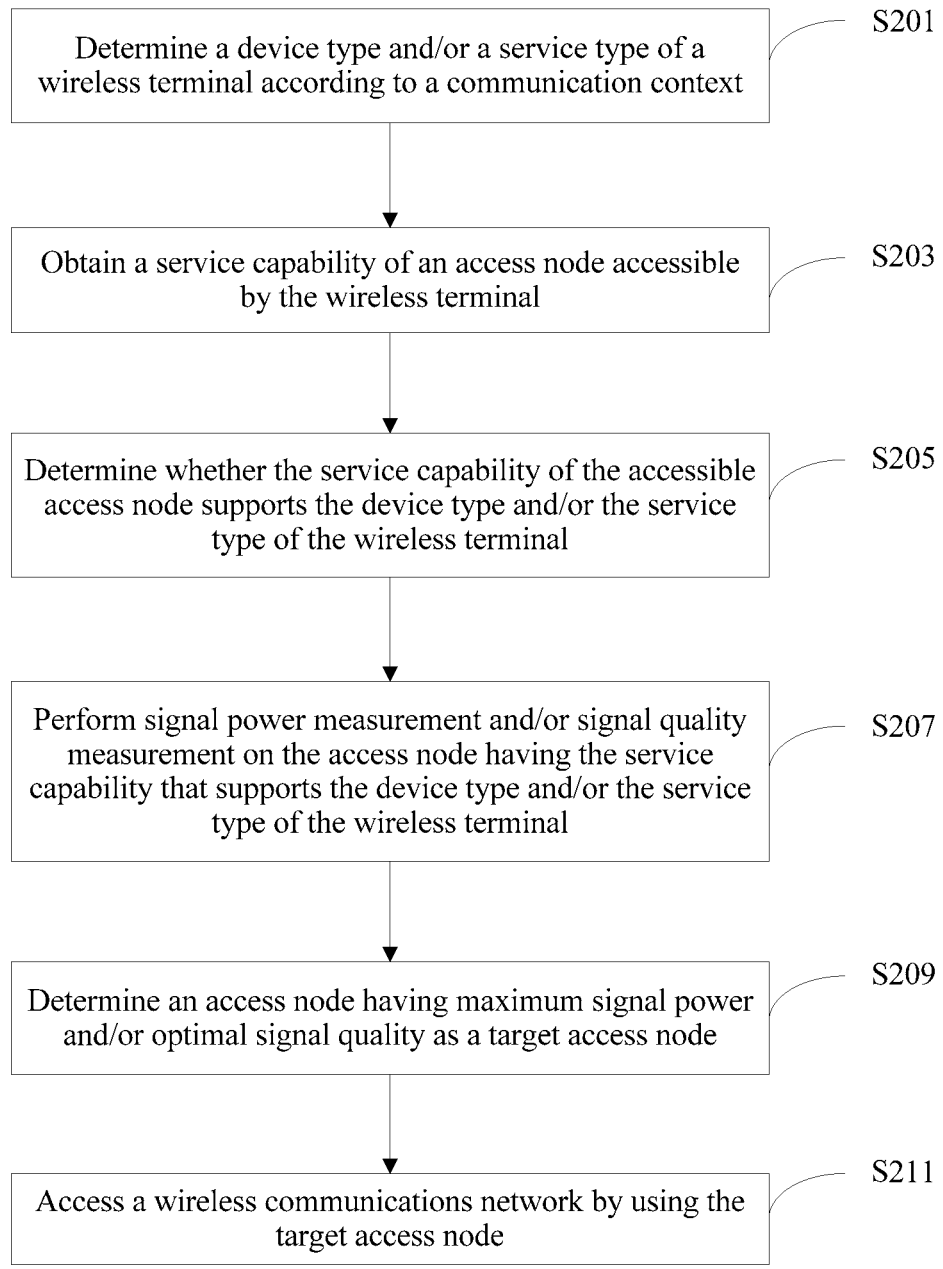
FIG. 2 is a schematic flowchart of another wireless communications access method according to an embodiment of the present invention.

FIG. 2 is a schematic flowchart of another wireless communications access method according to an embodiment of the present invention. As shown in FIG. 2, the wireless communications access method in this embodiment is executed by a wireless terminal. An application scenario is that the wireless terminal selects an access node during power-on, and the method includes the following steps:

S201. Determine a device type and/or a service type of a wireless terminal according to a communication context.

S203. Obtain a service capability of an access node accessible by the wireless terminal.

S205. Determine whether the service capability of the accessible access node supports the device type and/or the service type of the wireless terminal.

S207. Perform signal power measurement and/or signal quality measurement on the access node having the service capability that supports the device type and/or the service type of the wireless terminal. The performing signal power measurement and/or signal quality measurement on the access node herein may be performed before step S203.

S209. Determine an access node having maximum signal power and/or optimal signal quality as a target access node.

Specifically, the wireless terminal has not accessed any accessible node during power-on. The wireless terminal determines the device type and/or the service type of the wireless terminal according to the communication context. Because the wireless terminal has not initiated a service request during power-on, some wireless terminals may not determine service types of the wireless terminals during power-on, but can only determine device types of the wireless terminals.

The wireless terminal obtains the service capability of the access node locally accessible by the wireless terminal. A specific method for obtaining the service capability of the accessible node is similar to the method for obtaining the service capability of the accessible node that is in the foregoing embodiment, and details are not described herein.

The wireless terminal determines whether the service capability of the accessible access node supports the device type and/or the service type of the wireless terminal. If there are multiple access nodes having the service capability that supports the device type and/or the service type of the wireless terminal, the wireless terminal may select, according to signal strength and/or signal quality of a measured access node, an access node having maximum signal strength or optimal signal quality as the target access node.

Alternatively, if the access node having the service capability that supports the device type and/or the service type of the wireless terminal has a priority, the priority is sent by the access node to the wireless terminal by using broadcast system information or is sent by a cloud platform to the wireless terminal, or is preset in the wireless terminal; and the wireless terminal may select, according to the priority of the access node, an access node having a highest priority as the target access node.

In addition, if there are multiple access nodes having the service capability that supports the device type and/or the service type of the wireless terminal, the wireless terminal may select an access node according to a status of the access node, for example, the wireless terminal selects, according to a load or congestion status of the access node, an access node having relatively low load or a non-congested access node as the target access node.

S211. Access a wireless communications network by using the target access node.

Figure 3:
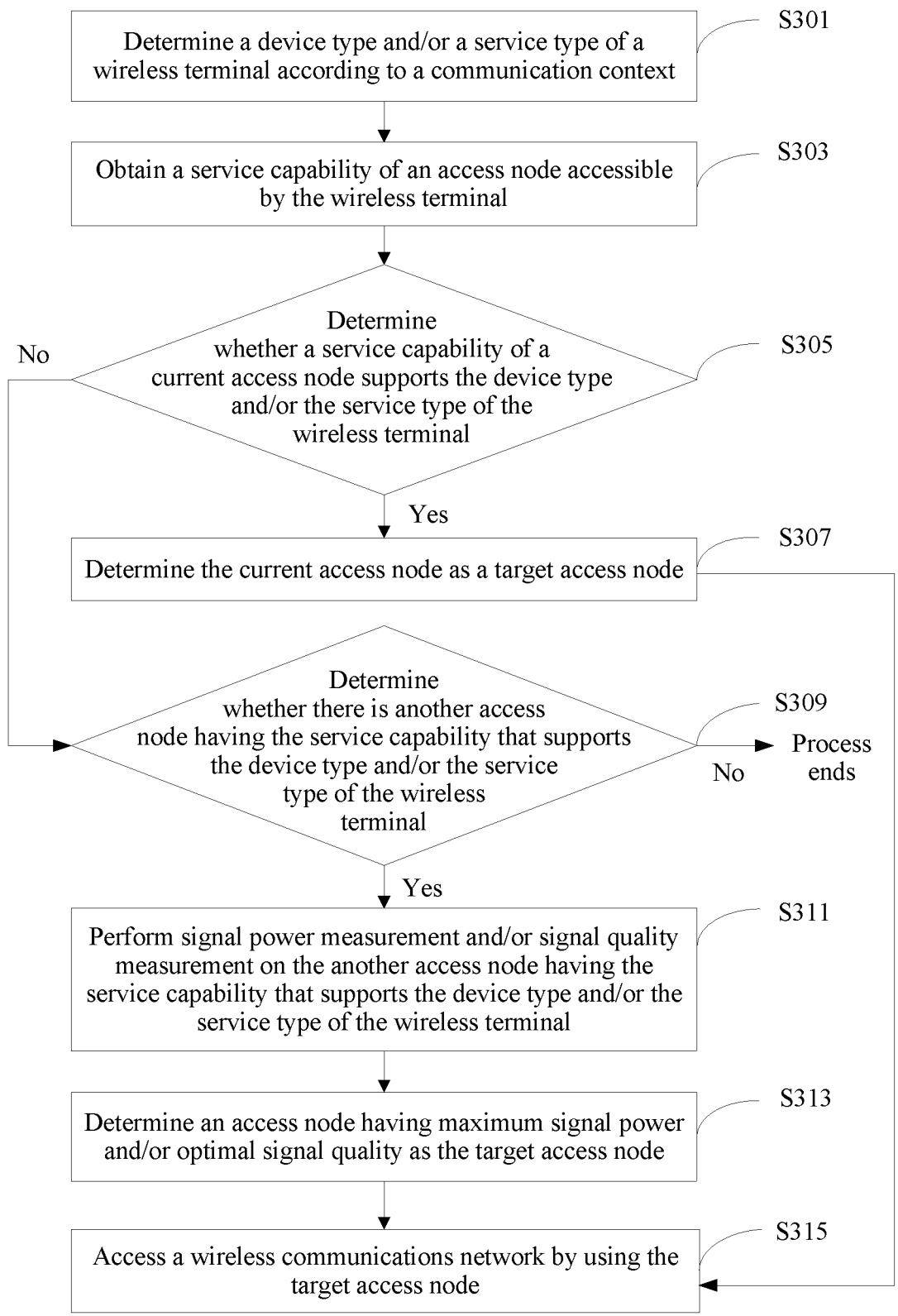
FIG. 3 is a schematic flowchart of another wireless communications access method according to an embodiment of the present invention.

FIG. 3 is a schematic flowchart of another wireless communications access method according to an embodiment of the present invention. As shown in FIG. 3, the wireless communications access method in this embodiment is executed by a wireless terminal. An application scenario is that when having accessed a current access node, and initiating a registration request or a service request, the wireless terminal re-selects an access node, and the method includes the following steps:

S301. Determine a device type and/or a service type of a wireless terminal according to a communication context.

S303. Obtain a service capability of an access node accessible by the wireless terminal.

The access node accessible by the wireless terminal includes a current access node and another locally accessible access node. The another access node may be a 3GPP access node, or may be a non-3GPP access node, or may be a local communications access device.

S305. Determine whether a service capability of a current access node supports the device type and/or the service type of the wireless terminal.

If the service capability of the current access node supports the device type and/or the service type of the wireless terminal, step S307 is performed; or if the service capability of the current access node does not support the device type and/or the service type of the wireless terminal, step S309 is performed.

S307. Determine the current access node as a target access node; and go to step S315.

If the service capability of the current access node supports the device type and/or the service type of the wireless terminal, the wireless terminal directly determines the current access node as the target access node, and the wireless terminal continues to camp on the current access node, so as to prevent the wireless terminal from switching access nodes, thereby reducing signaling overheads.

S309. Determine whether there is another access node having the service capability that supports the device type and/or the service type of the wireless terminal.

If there is the another access node having the service capability that supports the device type and/or the service type of the wireless terminal, step S311 is performed;

or if there is no other access node having the service capability that supports the device type and/or the service type of the wireless terminal, the process ends.

S311. Perform signal power measurement and/or signal quality measurement on the another access node having the service capability that supports the device type and/or the service type of the wireless terminal.

Step S311 may be performed before step S303, and a sequence of performing step S311 is not limited herein.

S313. Determine an access node having maximum signal power and/or optimal signal quality as the target access node.

Specifically, if there are multiple access nodes having the service capability that supports the device type and/or the service type of the wireless terminal, the wireless terminal may select, according to signal strength and/or signal quality of a measured access node, an access node having maximum signal strength or optimal signal quality as the target access node.

Alternatively, if the access node having the service capability that supports the device type and/or the service type of the wireless terminal has a priority, the priority is sent by the access node to the wireless terminal by using broadcast system information or is sent by a cloud platform to the wireless terminal, or is preset in the wireless terminal; and the wireless terminal may select, according to the priority of the access node, an access node having a highest priority as the target access node.

In addition, if there are multiple access nodes having the service capability that supports the device type and/or the service type of the wireless terminal, the wireless terminal may select an access node according to a status of the access node, for example, the wireless terminal selects, according to a load or congestion status of the access node, an access node having relatively low load or a non-congested access node as the target access node.

S315. Access a wireless communications network by using the target access node.

In step S315, if the target access node is not the current access node, it may be implemented, by reselecting a cell by the wireless terminal or triggering, by using a network, the wireless terminal to redirect to or switch to another access network, that the wireless terminal accesses the wireless communications network by using the target access node. Alternatively, the wireless terminal may establish a wireless connection to the target access node while maintaining a wireless connection to the current access node.

In this embodiment of the present invention, the wireless terminal determines, as the target access node according to the device type and/or the service type of the wireless terminal and the service capability of the access node accessible by the wireless terminal, the access node having the service capability that supports the device type and/or the service type of the wireless terminal, and accesses the wireless communications network by using the target access node. Therefore, the wireless terminal autonomously selects an access node having a service capability that can meet a communication requirement of the wireless terminal to access the wireless communications network, thereby improving communication quality of service of the wireless terminal.

Figure 4:
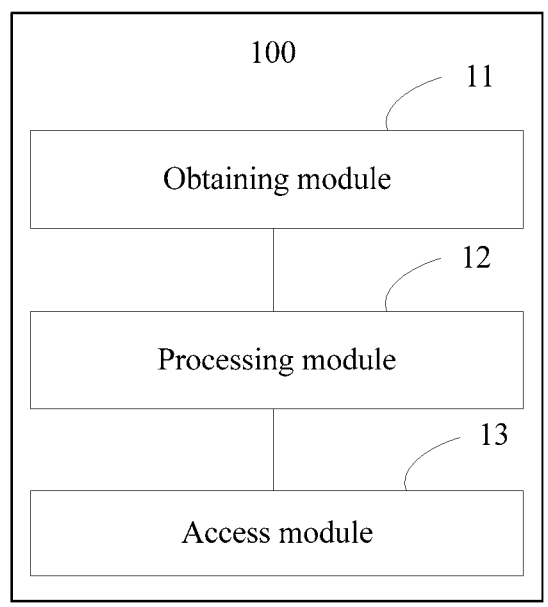
FIG. 4 is a schematic structural diagram of a wireless terminal according to an embodiment of the present invention.

FIG. 4 is a schematic structural diagram of a wireless terminal according to an embodiment of the present invention. As shown in FIG. 4, the wireless terminal is configured to perform the method in the foregoing embodiment, and has a module corresponding to each method step in the foregoing method embodiment, and a wireless terminal 100 includes:

an obtaining module 11, configured to obtain a service capability of an access node accessible by the wireless terminal, where the service capability is used to indicate communication quality of service supported by the access node, and the obtaining module 11 sends the obtained service capability of the access node accessible by the wireless terminal to a processing module 12;

the processing module 12, configured to determine, as a target access node according to the service capability of the access node and a device type and/or a service type of the wireless terminal, an access node having the service capability that supports the device type and/or the service type of the wireless terminal; and an access module 13, configured to access, according to an instruction of the processing module 12, a wireless communications network by using the target access node.

Optionally, the processing module 12 is further configured to:

determine the device type and/or the service type of the wireless terminal according to a communication context of the wireless terminal.

Optionally, cell broadcast information of the wireless communications network includes the service capability of the access node. The processing module 12 is further configured to: obtain, according to the cell broadcast information, a service capability of a 3rd Generation Partnership Project access node accessible by the wireless terminal; and/or obtain, according to the cell broadcast information, a service capability of a non-3rd Generation Partnership Project access node accessible by the wireless terminal; and/or obtain a service capability of a local communications access device according to the cell broadcast information.

Optionally, the processing module 12 is further configured to:

if the wireless terminal has accessed a current access node, determine, according to a service capability of the current access node and the device type and/or the service type of the wireless terminal, whether the service capability of the current access node supports the device type and/or the service type of the wireless terminal;

and if the service capability of the current access node supports the device type and/or the service type of the wireless terminal, determine the current access node as the target access node.

Optionally, the processing module 12 is further configured to:

determine, according to the service capability of the access node and the device type and/or the service type of the wireless terminal, the access node having the service capability that supports the device type and/or the service type of the wireless terminal; and if there are multiple access nodes having the service capability that supports the device type and/or the service type of the wireless terminal, select, from the multiple access nodes, an access node having maximum signal power and/or optimal signal quality as the target access node; or select, from the multiple access nodes according to a preset priority, an access node having a highest preset priority as the target access node.

Optionally, the processing module 12 is further configured to:

if the wireless terminal has accessed the current access node, instruct the access module 13 to establish a wireless connection to the target access node while maintaining a wireless connection between the wireless terminal and the current access node; or instruct the access module 13 to release a wireless connection to the current access node and establish a wireless connection to the target access node.

It should be noted that each module of the foregoing terminal may be implemented by one or more hardware or software modules of an actual product, and a specific implementation thereof constitutes no limitation on the present invention.

In addition, a computer-readable medium is provided, including a computer-readable instruction used to perform, upon being executed, the following operation:

performing the operations in the method of the foregoing embodiment. Optionally, the computer-readable instruction may be further used to perform the operations of optional steps in the method of the foregoing embodiment.

In addition, a computer program product is provided, including the foregoing computer-readable medium.

In this embodiment of the present invention, the wireless terminal determines, as the target access node according to the device type and/or the service type of the wireless terminal and the service capability of the access node accessible by the wireless terminal, the access node having the service capability that supports the device type and/or the service type of the wireless terminal, and accesses the wireless communications network by using the target access node. Therefore, the wireless terminal autonomously selects an access node having a service capability that can meet a communication requirement of the wireless terminal to access the wireless communications network, thereby improving communication quality of service of the wireless terminal.

Figure 5:
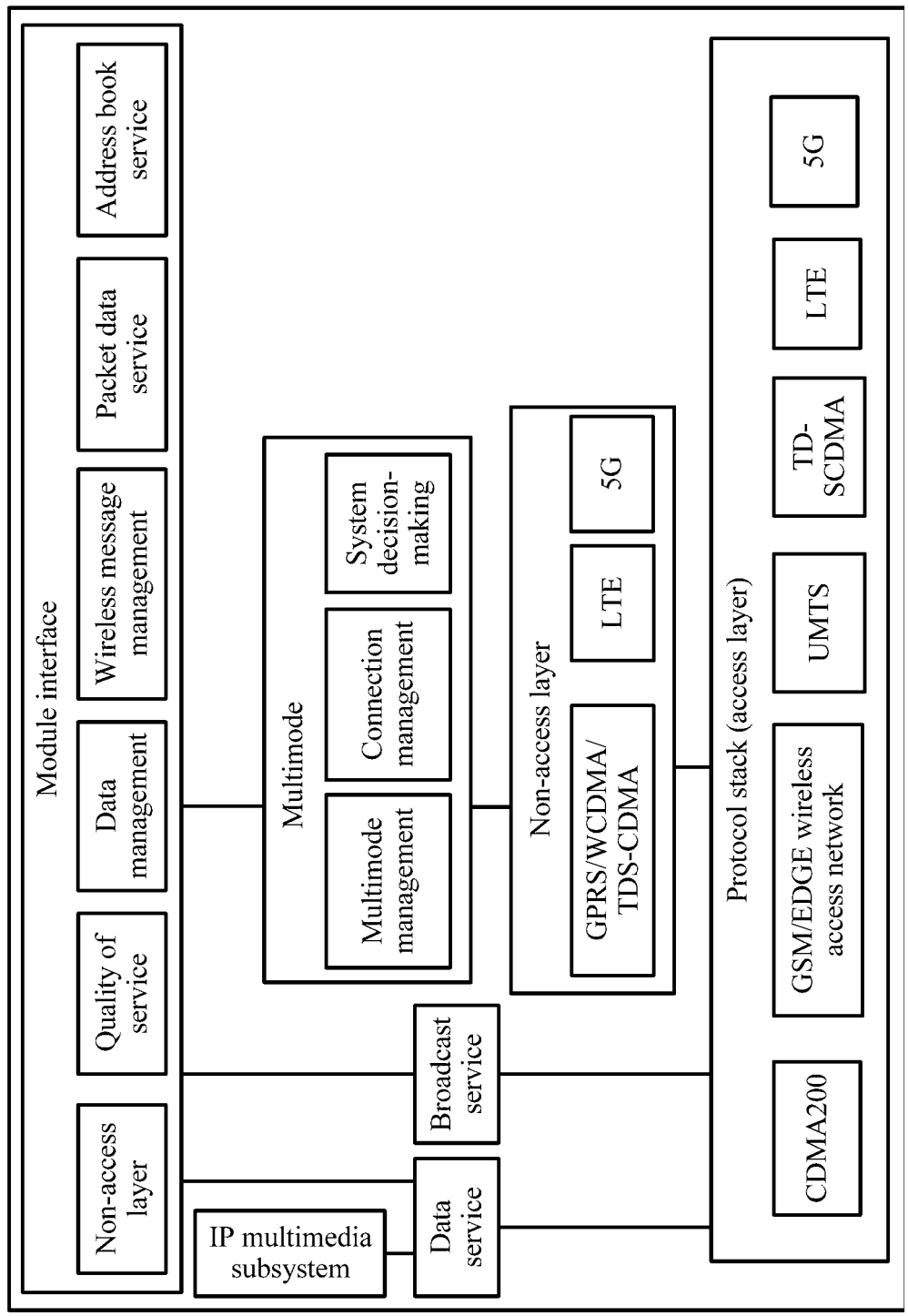
FIG. 5 is a schematic structural diagram of a processor according to an embodiment of the present invention.

FIG. 5 is a schematic structural diagram of a processor according to an embodiment of the present invention. As shown in FIG. 5, the processor 21 may be a central processing unit (Central Processing Unit, "CPU" for short), or the processor 21 may be another general purpose processor, a digital signal processor (DSP), an application-specific integrated circuit (ASIC), a field programmable gate array (FPGA), or another programmable logic device, a discrete gate or a transistor logic device, a discrete hardware component, or the like. The general purpose processor may be a microprocessor or may be any conventional processor, or the like. For example, the processor 21 may be MSM8974, or MSM8974 Pro, or MSM8926.

Specifically, the processor 21 includes a communications interface and a controller.

The communications interface is configured to obtain a service capability of an access node accessible by the wireless terminal, where the service capability is used to indicate communication quality of service supported by the access node.

The controller is configured to determine, as a target access node according to the service capability of the access node and a device type and/or a service type of the wireless terminal, an access node having the service capability that supports the device type and/or the service type of the wireless terminal; and the controller is further configured to instruct the communications interface to send a command, where the command instructs to access a wireless communications network by using the target access node.

The controller is further configured to:

determine the device type and/or the service type of the wireless terminal according to a communication context of the wireless terminal.

Cell broadcast information of the wireless communications network includes the service capability of the access node, and the controller is further configured to:

obtain, according to the cell broadcast information, a service capability of a 3rd Generation Partnership Project access node accessible by the wireless terminal; and/or obtain, according to the cell broadcast information, a service capability of a non-3rd Generation Partnership Project access node accessible by the wireless terminal; and/or obtain a service capability of a local communications access device according to the cell broadcast information.

The controller is further configured to:

if the wireless terminal has accessed a current access node, determine, according to a service capability of the current access node and the device type and/or the service type of the wireless terminal, whether the service capability of the current access node supports the device type and/or the service type of the wireless terminal;

and if the service capability of the current access node supports the device type and/or the service type of the wireless terminal, determine the current access node as the target access node.

The controller is further configured to:

determine, according to the service capability of the access node and the device type and/or the service type of the wireless terminal, the access node having the service capability that supports the device type and/or the service type of the wireless terminal; and if there are multiple access nodes having the service capability that supports the device type and/or the service type of the wireless terminal, select, from the multiple access nodes, an access node having maximum signal power and/or optimal signal quality as the target access node; or select, from the multiple access nodes according to a preset priority, an access node having a highest preset priority as the target access node.

The controller is further configured to:

if the wireless terminal has accessed the current access node, establish a wireless connection to the target access node while maintaining a wireless connection between the wireless terminal and the current access node; or release, by the wireless terminal, a wireless connection to the current access node, and establish a wireless connection to the target access node.

It should be understood that the processor 21 provided in this embodiment of the present invention may be used in the wireless terminal in the foregoing method embodiments to perform corresponding processes in the foregoing method embodiments. For ease of brevity, details are not described herein again.

FIG. 5 is an example of the processor provided in this embodiment of the present invention. A module of the processor is a module/program that has a corresponding function, and mainly includes an access layer, a non-access layer, a multimode, a module interface, and the like. The access layer is a module/program that performs connection and interaction with a base station in a network. The non-access layer can implement processing and interaction functions on top of an access layer function, a processing process between the processor and a network side, and the like. Other modules such as the multimode, the module interface, a data service, a broadcast service, an Internet Protocol (Internet Protocol, IP) multimedia subsystem of the processor can support the processor in accessing the network or support a service after the processor accesses the network. For example, the multimode manages communication in multiple working modes, and mainly includes multimode management, connection management, and system decision-making; and the module interface provides information interfaces for the processor to process various services, and mainly includes quality of service, data management, wireless message management, a packet data service, an address book service, and the like.

According to the processor provided in this embodiment, the wireless terminal determines, as the target access node according to the device type and/or the service type of the wireless terminal and the service capability of the access node accessible by the wireless terminal, the access node having the service capability that supports the device type and/or the service type of the wireless terminal, and accesses the wireless communications network by using the target access node. Therefore, the wireless terminal autonomously selects an access node having a service capability that can meet a communication requirement of the wireless terminal to access the wireless communications network, thereby improving communication quality of service of the wireless terminal.

Figure 6:
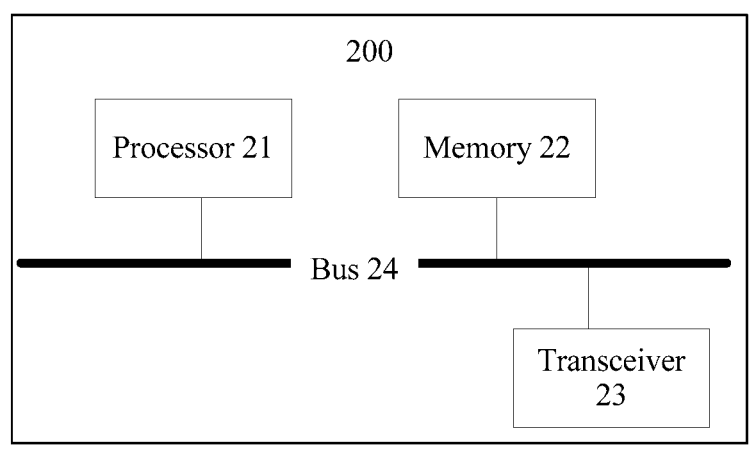
FIG. 6 is a schematic structural diagram of a wireless terminal according to an embodiment of the present invention.

FIG. 6 is a schematic structural diagram of a wireless terminal according to an embodiment of the present invention. As shown in FIG. 6, the wireless terminal is configured to perform the method in the foregoing embodiment, and a wireless terminal 200 includes:

a processor 21, a memory 22, a transceiver 23, and a bus 24. The processor 21, the memory 22, and the transceiver 23 communicate by using the bus 24.

The transceiver 23 is configured to: receive the service capability of the access node accessible by the wireless terminal, and send the service capability to the processor 21, where the service capability is used to indicate communication quality of service supported by the access node.

The processor 21 is the processor 21 shown in FIG. 5, and performs the function of the processor 21 shown in FIG. 5.

The transceiver is further configured to initiate a connection request to a target access node under control of the processor 21, so that the wireless terminal accesses a wireless communications network by using the target access node.

For a schematic block diagram of a module/program in the processor 21, refer to FIG. 5.

In addition to a data bus, the bus 24 may further include a power bus, a control bus, a status signal bus, and the like. However, for clarity of description, various buses are marked as the bus 24 in the figure.

It should be understood that the transceiver 23 further maintains a connection to one or more antennas.

It should be noted that, although for the terminal 200, only the processor 21, the memory 22, the transceiver 23, and the bus 24 are shown in FIG. 6, in a specific implementation process, persons skilled in the art should understand that the terminal 200 further includes another device required for implementing normal running. In addition, persons skilled in the art should understand that, according to a specific requirement, the terminal 200 may further include a hardware device that implements another additional function. In addition, persons skilled in the art should understand that the terminal 200 may also include only a device required for implementing the embodiments of the present invention, and does not necessarily include all devices shown in FIG. 6.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, reference may be made to a corresponding process in the foregoing method embodiments, and details are not described herein.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A wireless communications access method, wherein the method is applied to a wireless terminal, and comprises:
   obtaining a service capability of at least one access node accessible by the wireless terminal, wherein the service capability of each of the at least one access node is used to indicate communication quality of service supported by that access node;
   determining a particular access node having the service capability that supports a device type and a service type of the wireless terminal as a target access node according to the service capability of the particular access node and the device type and the service type of the wireless terminal, wherein determining the particular access node includes:
      if the wireless terminal has accessed a current access node, determining, according to a service capability of the current access node and the device type and the service type of the wireless terminal, whether the service capability of the current access node supports the device type and the service type of the wireless terminal; and
      if the service capability of the current access node supports the device type and the service type of the wireless terminal, determining the current access node as the target access node; and
   accessing a wireless communications network by using the target access node.

2. The wireless communications access method according to claim 1, wherein before the obtaining a service capability of at least one access node accessible by the wireless terminal, the method further comprises:
   determining the device type and the service type of the wireless terminal according to a communication context of the wireless terminal.

3. The wireless communications access method according to claim 1, wherein cell broadcast information of the wireless communications network comprises the service capability of the access node, and the obtaining a service capability of at least one access node accessible by the wireless terminal comprises at least one of:
   obtaining, according to the cell broadcast information, a service capability of a 3rd Generation Partnership Project access node accessible by the wireless terminal;

obtaining, according to the cell broadcast information, a service capability of a non-3rd Generation Partnership Project access node accessible by the wireless terminal; and obtaining a service capability of a local communications access device according to the cell broadcast information.

4. The wireless communications access method according to claim 1, wherein the determining a particular access node having the service capability that supports a device type and a service type of the wireless terminal as a target access node according to the service capability of the particular access node and the device type and the service type of the wireless terminal comprises:

determining, according to the service capability of the access node and the device type and the service type of the wireless terminal, the access node having the service capability that supports the device type and the service type of the wireless terminal; and if there are multiple access nodes having the service capability that supports the device type and the service type of the wireless terminal, at least one of:

selecting, from the multiple access nodes, an access node having at least one of maximum signal power and optimal signal quality as the target access node; and selecting, from the multiple access nodes according to a preset priority, an access node having a highest preset priority as the target access node.

5. The wireless communications access method according to claim 1, wherein the accessing a wireless communications network by using the target access node comprises:

if the wireless terminal has accessed the current access node, establishing a wireless connection to the target access node while maintaining a wireless connection between the wireless terminal and the current access node; or releasing, by the wireless terminal, a wireless connection to the current access node, and establishing a wireless connection to the target access node.

6. A processor, wherein the processor comprises a communications interface and a controller, wherein:

the communications interface is configured to obtain a service capability of an access node accessible by a wireless terminal associated with the processor, wherein the service capability is used to indicate communication quality of service supported by the access node; and the controller is configured to:

determine an access node having the service capability that supports a device type and a service type of the wireless terminal as a target access node according to the service capability of the access node and the device type and the service type of the wireless terminal, wherein determining the access node includes:

if the wireless terminal has accessed a current access node, determining, according to a service capability of the current access node and the device type and the service type of the wireless terminal, whether the service capability of the current access node supports the device type and the service type of the wireless terminal; and if the service capability of the current access node supports the device type and the service type of the wireless terminal, determining the current access node as the target access node; and instruct the communications interface to send a command, wherein the command instructs to access a wireless communications network by using the target access node.

7. The processor according to claim 6, wherein the controller is further configured to:

determine the device type and the service type of the wireless terminal according to a communication context of the wireless terminal.

8. The processor according to claim 6, wherein cell broadcast information of the wireless communications network comprises the service capability of the access node, and the controller is further configured to perform at least one of:

obtain, according to the cell broadcast information, a service capability of a 3rd Generation Partnership Project access node accessible by the wireless terminal;

obtain, according to the cell broadcast information, a service capability of a non-3rd Generation Partnership Project access node accessible by the wireless terminal; and obtain a service capability of a local communications access device according to the cell broadcast information.

9. The processor according to claim 6, wherein the controller is further configured to:

determine, according to the service capability of the access node and the device type and the service type of the wireless terminal, the access node having the service capability that supports the device type and the service type of the wireless terminal; and if there are multiple access nodes having the service capability that supports the device type and the service type of the wireless terminal, at least one of:

select, from the multiple access nodes, an access node having at least one of maximum signal power and optimal signal quality as the target access node; or select, from the multiple access nodes according to a preset priority, an access node having a highest preset priority as the target access node.

10. The processor according to claim 6, wherein the controller is further configured to:

if the wireless terminal has accessed the current access node, establish a wireless connection to the target access node while maintaining a wireless connection between the wireless terminal and the current access node; or release, by the wireless terminal, a wireless connection to the current access node, and establish a wireless connection to the target access node.

11. A wireless terminal, comprising at least one processor, a transceiver, a memory, and a bus, wherein the at least one processor, the transceiver, and the memory communicate by using the bus; and the memory is configured to store an instruction;

the transceiver is configured to:

receive a service capability of an access node accessible by the wireless terminal, and send the service capability to the at least one processor, wherein the service capability is used to indicate communication quality of service supported by the access node;

the at least one processor is configured to determine an access node having the service capability that supports a device type and a service type of the wireless terminal as a target access node according to the service capability of the access node and the device type and the service type of the wireless terminal, wherein determining the access node includes:
  if the wireless terminal has accessed a current access node, determining, according to a service capability of the current access node and the device type and the service type of the wireless terminal, whether the service capability of the current access node supports the device type and the service type of the wireless terminal; and
  if the service capability of the current access node supports the device type and the service type of the wireless terminal, determining the current access node as the target access node; and
the transceiver is further configured to initiate a connection request to a target access node under control of the at least one processor, wherein the wireless terminal accesses a wireless communications network by using the target access node.

12. The wireless terminal according to claim 11, wherein the at least one processor is further configured to:
  determine the device type and the service type of the wireless terminal according to a communication context of the wireless terminal.

13. The wireless terminal according to claim 11, wherein cell broadcast information of the wireless communications network comprises the service capability of the access node, and the at least one processor is further configured to perform at least one of:
  obtaining, according to the cell broadcast information, a service capability of a 3rd Generation Partnership Project access node accessible by the wireless terminal;
  obtaining, according to the cell broadcast information, a service capability of a non-3rd Generation Partnership Project access node accessible by the wireless terminal; and
  obtaining a service capability of a local communications access device according to the cell broadcast information.

14. The wireless terminal according to claim 11, wherein the at least one processor is further configured to:
  determine, according to the service capability of the access node and the device type and the service type of the wireless terminal, the access node having the service capability that supports the device type and the service type of the wireless terminal; and
  if there are multiple access nodes having the service capability that supports the device type and the service type of the wireless terminal, at least one of:
    select, from the multiple access nodes, an access node having at least one of maximum signal power and optimal signal quality as the target access node; and
    select, from the multiple access nodes according to a preset priority, an access node having a highest preset priority as the target access node.

15. The wireless terminal according to claim 11, wherein the at least one processor is further configured to:
  if the wireless terminal has accessed the current access node, establish a wireless connection to the target access node while maintaining a wireless connection between the wireless terminal and the current access node; or
  release, by the wireless terminal, a wireless connection to the current access node, and establishing a wireless connection to the target access node.

* * * * *

UNITED STATES PATENT AND TRADEMARK OFFICE
CERTIFICATE OF CORRECTION

PATENT NO.        : 10,492,127 B2
APPLICATION NO.   : 15/768236
DATED             : November 26, 2019
INVENTOR(S)       : Xiaoyan Duan and Hui Jin Page 1 of 1

It is certified that error appears in the above-identified patent and that said Letters Patent is hereby corrected as shown below:

In the Specification

In Column 1, Lines 15-18, below "entireties" delete "This application claims priority to Chinese Patent Application No. 201510672829.0, filed with the Chinese Patent Office on Oct. 15, 2015, which is incorporated herein by reference in its entirety.".

Signed and Sealed this
Fourth Day of February, 2020

Andrei Iancu
*Director of the United States Patent and Trademark Office*